United States Patent [19]
McClary

[11] Patent Number: 6,042,473
[45] Date of Patent: Mar. 28, 2000

[54] VENTILATING PANEL FOR VEHICLES

[76] Inventor: Bradley K. McClary, 3501 Champion Lake Blvd., Apt. 611, Shreveport, La. 71105

[21] Appl. No.: 09/038,081

[22] Filed: Mar. 11, 1998

Related U.S. Application Data

[63] Continuation-in-part of application No. 08/709,908, Sep. 9, 1996, abandoned.

[51] Int. Cl.⁷ .................................................. B60H 1/24
[52] U.S. Cl. ......................... 454/133; 454/131; 296/152
[58] Field of Search ................................... 454/131, 133; 296/152, 154; 160/105

[56] References Cited

U.S. PATENT DOCUMENTS

| | | | |
|---|---|---|---|
| 2,622,921 | 12/1952 | Zagel | 296/44 |
| 3,659,516 | 5/1972 | MacDonald | 454/133 |
| 3,915,078 | 10/1975 | Woods, Jr. | |
| 4,089,256 | 5/1978 | Furcini | |
| 4,347,781 | 9/1982 | Hassell | |
| 4,558,633 | 12/1985 | Lingg | |
| 4,756,242 | 7/1988 | Keith | |
| 4,913,212 | 4/1990 | Clavier | 160/105 |
| 5,251,953 | 10/1993 | Willey | 296/152 |
| 5,284,377 | 2/1994 | Krenciprock | 454/131 |
| 5,570,542 | 11/1996 | Cameron | 160/103 |

FOREIGN PATENT DOCUMENTS

| | | | |
|---|---|---|---|
| 223519 | 12/1984 | Japan | 296/152 |
| 59-223519 | 12/1984 | Japan | 296/152 |

*Primary Examiner*—Harold Joyce
*Assistant Examiner*—Derek S. Boles
*Attorney, Agent, or Firm*—Keaty Professional Law Corporation

[57] ABSTRACT

The invention relates to a safety ventilating panel for use in vehicles provided with retractable windows mounted in a window frame. The safety panel is mounted on top of a window panel, and a sealing gasket attached to the bottom edge of the safety panel receives a top edge of a slightly retracted window. The safety panel is provided with a plurality of angularly oriented openings to allow creation of vacuum on the interior side of the vehicle. An outwardly convex panel body facilitates creation of a pressure differential for a more effective airflow from the interior of the vehicle. A safety flange secured on the interior side of the safety panel extends upwardly and inwardly in relation to the safety panel body to prevent intrusion into the vehicle by unauthorized persons.

14 Claims, 2 Drawing Sheets

VENTILATING PANEL FOR VEHICLES

CROSS-REFERENCE TO RELATED APPLICATIONS

This application is a continuation-in-part of my co-pending application Ser. No. 709,908 filed on Sep. 9, 1996, now abandoned, the full disclosure of which is incorporated by reference herein.

BACKGROUND OF THE INVENTION

This invention relates to devices for ventilating the interior of a vehicle, and more particularly to a device suitable for mounting within a window frame of a vehicle. The device draws unwanted odors from the interior of the vehicle to the exterior thereof, while permitting air circulation between the interior and the exterior of the vehicle.

It is common practice to open windows of a vehicle when driving or while the vehicle is parked, so as to allow tobacco smoke, pet smells and other obnoxious odors to be ventilated into the atmosphere and at the same time admit fresh ambient air into the interior of the vehicle. However, opening the vehicle window when the vehicle is in motion significantly affects aerodynamic qualities of the vehicle, causing airflow to enter the vehicle and exert an opposite force to the direction of travel. This force, in turn, adversely affects gas consumption of the vehicle.

As a result, many people prefer to use ventilation feature on the control panel of a vehicle to admit fresh air into the vehicle. While the fan functions adequately in many cases, it still often leaves undesirable odors in the vehicle, especially if the odors have penetrated into the interior fabric. Consequently, many people prefer to open windows to allow the airflow to enter the vehicle with a greater force.

Various solutions have been offered to the problem of safe ventilating of a vehicle with the use of a panel mountable between a side window glass and a door frame of a vehicle. One of such devices is disclosed in Japanese Patent Application No. 223,519 published in 1984, entitled "Window Panel of Car Door." The application discloses an anti-theft window panel that is fitted onto the upper edge of a car window pane. The top edge of the panel corresponds to the receiving groove located above the door window. The panel is provided with a plurality of holes to allow air circulation, and a groove for fitting over the window pane. The device allows regulation of air temperature inside a car.

Another example of an air ventilating panel is disclosed in U.S. Pat. No. 4,913,212 issued on Apr. 3, 1990 to Clavier for "Vehicle Window Screen Assembly." This device is made in the form of a one-piece molded frame and lattice arrangement made of strong plastic. The top edge of the window pane holds the frame against the top of the window opening, while a rounded corner of the ventilating panel conforms to the rounded corner of the window opening conventionally found in cars, trucks, and other vehicles.

Still further example of a ventilating insert is shown in U.S. Pat. No. 5,570,542 issued on Nov. 5, 1996 to Cameron for "Safety Shield Window Insert." The safety device in accordance with the '542 patent fits within the standard frame of a window and is retained therein by an upper edge of the window, fitting within a groove configured on the lower edge of the window insert. The panel has apertures to allow air inflow and/or outflow to provide a continuous flow of fresh air into the vehicle.

While these devices allow air exchange between the interior and exterior of the vehicle, none of them discloses a ventilating panel which facilitates forceful removal of air from the interior of the vehicle by creating pressure differential between the interior of the vehicle and an exterior thereof. Such a forceful air movement substantially increases the speed, with which the interior of the car is ventilated and obnoxious odors are removed.

An additional disadvantage of ventilating panels shown in the prior art is seen in their limited ability to prevent unauthorized intrusion into the vehicle through the panel. Known ventilating panels have a straight top edge that fits into the groove of the window frame, in a space normally occupied by the top edge of a window glass pane. However, since the panels are made from relatively flexible material, there is a possibility that a flat-sided object, such as a screwdriver can be inserted between the frame and the ventilating panel, allowing unauthorized access to the interior of the car.

The present invention contemplates elimination of drawbacks associated with the prior art and provision of a safety ventilating panel for positioning in a window of a vehicle with increased security features and improved aerodynamics.

SUMMARY OF THE INVENTION

It is, therefore, an object of the present invention to provide a ventilating panel for use in vehicles with retractable window panels.

It is another object of the present invention to provide a window ventilating device that facilitates creation of a vacuum, or pressure differential between the interior of a vehicle and exterior thereof.

It is a further object of the present invention to provide a window ventilating panel that resists tampering and affords protection against forceful bypassing of the ventilating panel in an effort to gain unauthorized access to the interior of a vehicle.

It is a further object of the present invention to provide a safety ventilating panel which is easy to position and inexpensive to manufacture.

These and other objects of the invention are achieved through a provision of a safety ventilating panel made from a strong transparent material, such as polycarbonate, plexiglass and the like. The safety panel comprises a body having a top edge, which engages within a window frame of a vehicle, and a bottom edge, which engages with a window panel of the vehicle.

The safety panel is provided with a flange that extends outwardly and upwardly a distance from an upper edge of the safety panel. The safety flange is securely attached to an interior surface of the panel and covers a space between the panel body and a receiving gasket of the window frame. The safety flange is designed to prevent intrusion into the interior of the vehicle by unauthorized persons.

The panel body is provided with a plurality of angularly formed openings to allow air circulation and ventilation of the vehicle. The openings have their inlets on the interior side of the panel and outlets—on the exterior side of the panel. The outlets of the openings are oriented rearwardly and outwardly in relation to the inlets of the openings.

When a vehicle is in a forward motion, a vacuum, or pressure differential is created between the interior and exterior of the vehicle, thereby facilitating a forceful removal of undesirable odors from the interior of the vehicle. In one of the embodiments, the safety panel is formed outwardly convex so as to further increase the pressure differential.

BRIEF DESCRIPTION OF THE DRAWINGS

Reference will now be made to the drawings, wherein like parts are designated by like numerals, and wherein.

DETAILED DESCRIPTION OF THE PREFERRED EMBODIMENT

Turning now to the drawings in more detail, numeral 10 designates the ventilating panel in accordance with the present invention. The ventilating panel is comprised of a first portion 12 and a second portion 14 integrally connected to the first portion 12 at a generally obtuse angle. The first portion 12 is shaped to follow the contours of a side panel of a vehicle window panel 16, while the second portion 14 follows the contours of the top edge of the window panel 16.

Figure 1:
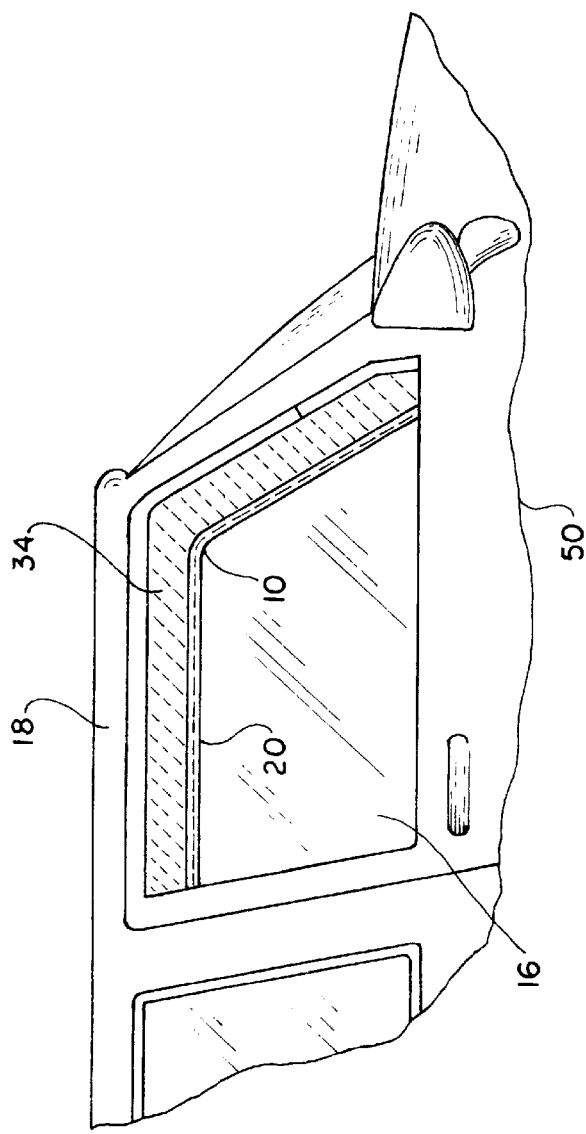
FIG. 1 is a perspective view of a ventilating panel in accordance with the present invention positioned in a window opening of a vehicle.
Figure 2:
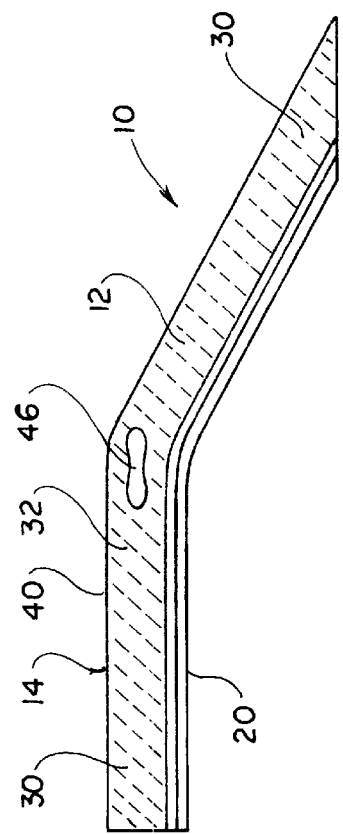
FIG. 2 is a side view of a driver's side ventilating panel in accordance with the present invention, as seen from an interior of a vehicle.

As shown in FIG. 1, the ventilating panel 10 is adapted for mounting along the front edge of a window in a vehicle and extends along the top edge thereof, between the window panel 16 and the frame 18 of the window opening formed in the vehicle. The ventilating panel 10 is preferably made from a strong transparent material, such as polycarbonate, plexiglass or other similarly transparent impact-resistant plastic. Of course, other materials can be successfully employed, provided such materials resist braking while allowing unobstructed vision to the driver, as will be described in more details hereinafter.

Figure 3:
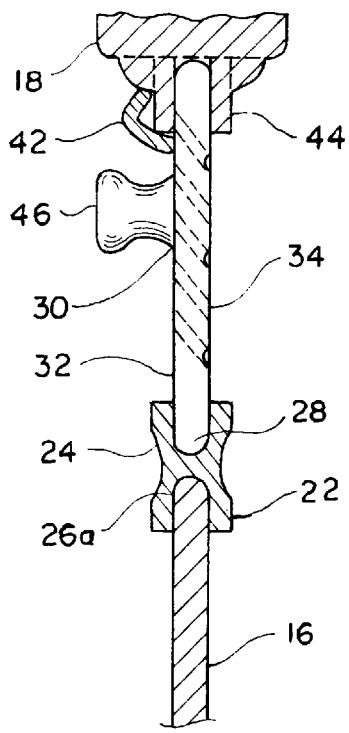
FIG. 3 is a cross-sectional view of a first embodiment of the ventilating panel in accordance with the present invention.
Figure 4:
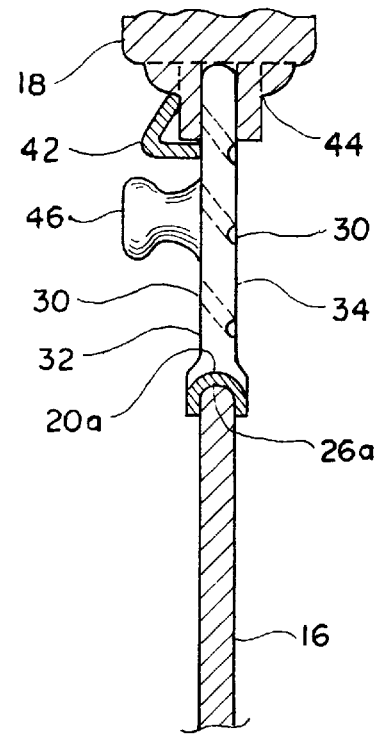
FIG. 4 is a cross-sectional view of the second embodiment of a ventilating panel in accordance with the present invention.

Extending along the bottom edge of the panel 10 is a window gasket 20 which is adapted to fit over the top edge of the window panel 16 in a sealing, detachable relationship. As can be seen in FIGS. 3 and 4, the gasket 20 can be formed in a number of different ways, two of which are illustrated in the drawings. The first embodiment of the gasket 20 is shown in FIG. 3, wherein the gasket 20 is shown to comprise a first upwardly grooved member 22 and a second downwardly grooved member 24. The members 22 and 24 are integrally connected with each other and are each provided with elongated grooves 26 and 28, respectively. The groove 26 is sized and shaped to accommodate the top edge of a glass window panel 16. The groove 28 is sized and shaped to accommodate, in a sealing relationship, the bottom edge of the portions 12 and 14 of the ventilating panel 10.

The embodiment of FIG. 4 illustrates a different embodiment of the gasket 20, wherein an upwardly recessed groove 26a is formed in the gasket to accommodate the top edge of the window panel 16. The bottom edge of the panel 10 is glued or otherwise fixedly secured to an opposite side of the gasket 20 to allow positioning of the panel 10 in a sealing engagement with the window panel 16.

A plurality of apertures 30 are formed in the panel 10, in portions 12 and 14, with the apertures 30 extending through the thickness of the ventilating panel 10. Each aperture 30 is formed at an angle to a vertical axis of the panel 10, so that an inlet of each of the apertures 30 is at a different vertical level from the outlet thereof. The apertures 30 extend downwardly and rearwardly from an inner surface 32 to the outward surface 34 of the panel 10, as can be better seen in FIGS. 3 and 4. The apertures 30 can be formed in a staggered relationship with respect to each other, in alignment, or positioned in any random order, as desired.

Each aperture 30 can be 3/32 inch in diameter, spaced at between 1/18 to 1/4 inch intervals. The apertures 30 formed at substantially the same angle in the body of the panel 10 allow to forcefully draw air from the interior of the vehicle to the exterior thereof, creating a pressure differential or vacuum on the interior of the vehicle, thereby facilitating air exchange and substantially improving the airflow from the vehicle. This phenomenon is particularly evident during motion of a vehicle, with the speed of movement of the vehicle improving the air circulation through the panel 10.

Securely attached adjacent the top edge 40 of the panel 10 is a safety flange 42 which extends a distance outwardly from the interior surface 32 of the panel 10 and curves upwardly in a hook-shaped manner. The safety flange 42 abuts with its free end against a downwardly depending gasket 44, which forms a part of the window opening 18. The flange 42 contacts the gasket 44 and prevents an unauthorized person from inserting a flat object, such as a flat head screwdriver through the panel 10 to obtain access to the interior of the vehicle. By engaging within a groove formed in the gasket 44, the safety flange 42 makes it considerably more difficult for an intruder to temper with the ventilating panel 10 and open the vehicle door.

A handle 46 is provided on the inner surface 32 of the ventilating panel 10, the handle 46 being adapted to be grasped by a user when positioning or removing the panel 10 from the vehicle window. Although only one handle 46 is illustrated in the drawings, it should be apparent that two handles can be secured on the panel 10, if desired, for convenience of a user.

Figure 5:
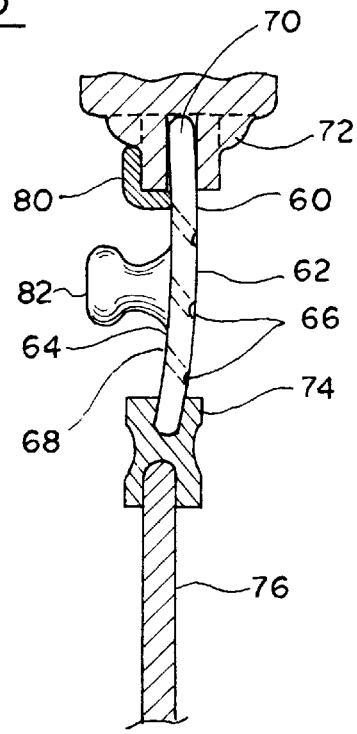
FIG. 5 is a cross-sectional view of the third embodiment of the ventilating panel in accordance with the present invention, with particular emphasis on increased ventilating capabilities.

FIG. 5 illustrates the third embodiment of the ventilating panel in accordance with the present invention. The panel 60 has an outwardly convex body with an exterior surface 62 and an interior surface 64. A plurality of openings 66 are formed through the panel 66 body, each opening 66 being directed at the same angle in a parallel relationship to each other. Each opening 66 has an inlet 68 on the interior surface 64 and an outlet formed rearwardly and downwardly in relation to the inlet 68. Each outlet is formed on the exterior surface 62.

By forming the panel 60 outwardly convex, it is possible to achieve a greater pressure differential, or vacuum in the interior of the vehicle, thereby enhancing the force of the airflow from the interior of the vehicle to the exterior thereof. As a result, the air circulation is substantially increased, and the undesirable odors are removed from the interior of the vehicle at a greater speed.

Similarly to the embodiments shown in FIGS. 3 and 4, the panel 60 fits in a groove 70 formed in a window-receiving gasket 72 of the vehicle window frame. The gasket 72 surrounds the top edge of the panel 60 in a sealing relationship when the panel 60 is positioned within the window frame.

The bottom of the panel 60 can be manufactured with a gasket 74, which is similar to the gasket 20 or, alternatively, it can be manufactured similarly to the gasket 20a in a manner shown in the embodiment of FIG. 4. The gasket 74 fits over a top edge of a window panel 76, similarly to the window panel 16 of the embodiment shown in FIGS. 3 and 4.

A safety flange 80 can be secured on the panel 60, the flange 80 extending upwardly from its point of attachment a distance from the top edge of the panel 60. The safety gasket 80, similarly to the gasket 42, is designed to prevent unauthorized intrusion into the interior of the vehicle. One or more handles 82 are secured on the inner surface 64 of the panel 60 to allow positioning of the panel in a window frame of a vehicle.

The panel 60 can be manufactured from a strong, transparent plastic that resists braking while at the same time allowing the panel 60 to withstand forces acting on the surface of the panel while the vehicle is in motion. As the vehicle 50 is driven forwardly, the air inside the vehicle is drawn through the openings 30, 66 and, due to the reduced pressure created by the airflow on the exterior of the vehicle, the undesirable odors, such as cigarette smoke, fumes, stale air, pet odors, and the like are removed from the interior of the vehicle. When the vehicle is parked, the air circulation through the apertures 30, 66 continues, allowing to cool down the temperature inside of the vehicle during hot weather.

When not in use, the ventilating panels 10, 60 are easily removed from the engagement in the window frame by slightly rolling down the windows 16, 76 and moving the panels 10, 60 downwardly to disengage from the grooves within the window gaskets and then removing the panels 10, 60 from their engagement with the top edge of the window panels. When not in use, the ventilating panel can be easily stored in the trunk of a car and retrieved for positioning in the window frame.

The ventilating panel can be manufactured in pairs, one for a driver's side, one for the passenger's side of a vehicle, it being understood that the passenger's side panel is a mirror image of the driver's side panel. Since the ventilating panels 10, 60 are formed from a transparent material the vision of a driver is not impaired.

If desired, the handles 46, 82 can be secured on the panels 10,60 respectively, after the manufacture of the panel bodies have been completed. In this manner, the same mold can be used for both passenger's side and driver's side ventilating panel, and the handles can be attached to their respective interior surfaces after the molding is completed.

Many other changes and modifications can be made in the design of the present invention without departing from the spirit thereof. I, therefore, pray that my rights to the present invention be limited only by the scope of the appended claims.

I claim:

1. A safety ventilating panel for a vehicle window defined by a retractable window panel movable within a window frame, the safety panel comprising:

a safety panel body having a top edge engageable with the vehicle window frame and a bottom edge detachably engageable with the vehicle window panel, said body being provided with a plurality of through openings for increasing a pressure differential between an interior side of the vehicle and an exterior of the vehicle by forcefully drawing air from an interior of the vehicle; and a safety flange securely attached to an interior surface of said body a distance from an upper edge of said body, said safety flange extending upwardly and inwardly from said body in relation to the interior of said vehicle, said safety flange covering a space between said panel body and a receiving gasket of the window frame to prevent intrusion into the interior of the vehicle by unauthorized persons.

2. The safety panel of claim 1, wherein said body is formed from a substantially transparent material.

3. The safety panel of claim 1, wherein each of said openings extends at an angle to a vertical axis of said body, with an outlet of each of said openings being on an exterior surface of said body and being directed rearwardly and downwardly in relation to an inlet of each of said openings.

4. The safety panel of claim 1, wherein said body has a generally planar configuration.

5. The safety panel wherein said body is outwardly convex to facilitate increase in pressure differential between the interior of said vehicle and exterior of said vehicle.

6. The safety panel of claim 1, further comprising at least one handle mounted on the interior surface of said body to facilitate positioning and removal of said safety panel from said vehicle.

7. The safety panel of claim 1, further comprising a sealing gasket securely attached to the bottom edge of said body, said sealing gasket having a groove for receiving a top edge of said vehicle window panel therein.

8. The safety panel of claim 1, wherein said body comprises a first portion for extending along a top edge of said vehicle window frame and a second portion integrally connected to said first portion at an obtuse angle to said first portion, said second portion extending along at least a portion of a front side of said vehicle window frame.

9. A safety ventilating panel for a vehicle window defined by a retractable window panel movable within a window frame, the safety panel comprising:

a safety panel body having a top edge engageable with the vehicle window frame and a bottom edge detachably engageable with the vehicle window panel, said body being provided with a plurality of through openings for increasing a pressure differential between an interior side of the vehicle and an exterior of the vehicle by forcefully drawing air from an interior of the vehicle; and a safety flange securely attached to an interior surface of said body a distance from an upper edge of said body, said safety flange extending upwardly and inwardly from said body in relation to the interior of said vehicle, said body being outwardly convex, said safety flange covering a space between said panel body and a receiving gasket of the window frame to prevent intrusion into the interior of the vehicle by unauthorized persons.

10. The safety panel of claim 9, wherein each of said openings is angularly disposed in relation to a vertical axis of said body, each of said opening having an inlet on the interior surface of said body and an outlet on an exterior surface of said body, each said outlet being located rearwardly and downwardly in relation to a respective inlet.

11. The safety panel of claim 9, further comprising at least one handle mounted on the interior surface of said body for manual positioning and removal of said safety panel from said vehicle.

12. The safety panel of claim 9, further comprising a gasket for detachable engagement with the vehicle window panel, said gasket being provided with a groove for receiving said vehicle window panel in a sealing engagement therein.

13. The safety panel of claim 7, wherein said sealing gasket further comprises a second, upwardly facing groove for receiving a bottom edge of said body.

14. The safety panel of claim 12, wherein said sealing gasket is further provided with a second, upwardly facing groove for receiving a bottom edge of said body.

* * * * *